(12) United States Patent
Nair et al.

(10) Patent No.: US 7,053,960 B2
(45) Date of Patent: May 30, 2006

(54) SYSTEMS AND METHODS FOR ADJUSTING IMAGE CONTRAST

(75) Inventors: Ajith N. Nair, Lawrenceville, GA (US); Peter G. Schreiner, III, Atlanta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 619 days.

(21) Appl. No.: 10/266,827

(22) Filed: Oct. 8, 2002

(65) Prior Publication Data

US 2004/0066469 A1  Apr. 8, 2004

(51) Int. Cl.
*H04N 5/52* (2006.01)
(52) U.S. Cl. ............... 348/678; 348/682; 348/691; 348/558
(58) Field of Classification Search ................ 348/678, 348/673, 682, 686, 687, 689, 690, 691, 558, 348/554, 555; H04N 5/52, 5/14, 5/57, 3/27, H04N 5/46
See application file for complete search history.

(56) References Cited

U.S. PATENT DOCUMENTS

| 4,198,651 | A | | 4/1980 | Barton et al. ............... 358/21 |
|---|---|---|---|---|
| RE32,148 | E | | 5/1986 | Avins et al. ................ 358/27 |
| 4,679,087 | A | * | 7/1987 | Torrano et al. ............ 348/673 |
| 5,339,114 | A | * | 8/1994 | Lagoni et al. ............. 348/673 |
| 5,410,363 | A | | 4/1995 | Capen et al. .............. 348/679 |
| 5,486,869 | A | * | 1/1996 | Cooper ....................... 348/525 |
| 5,754,250 | A | * | 5/1998 | Cooper ....................... 348/525 |
| 6,169,584 | B1 | * | 1/2001 | Glaab et al. ................ 348/724 |

\* cited by examiner

*Primary Examiner*—Sherrie Hsia

(57) ABSTRACT

Systems and methods for adjusting image contrast are provided. An exemplary method for adjusting image contrast includes determining a format of a television signal and outputting in conjunction with the television signal a reference level. If the television signal has a first format, then the reference level is caused to be substantially equal to a luminance level representing a black color in the first format. However, if the television signal has a second format, then the reference level is caused to be substantially equal to a luminance level representing a black color in the second format.

29 Claims, 7 Drawing Sheets

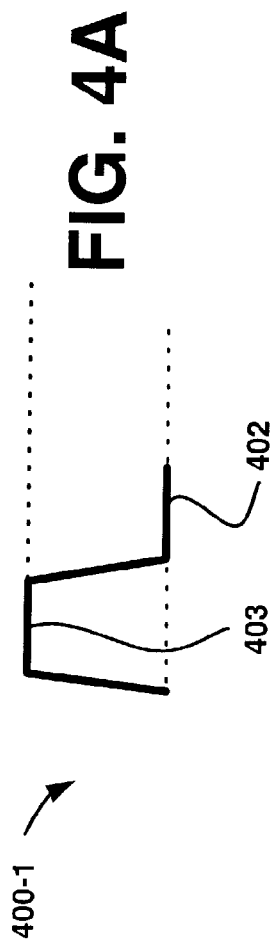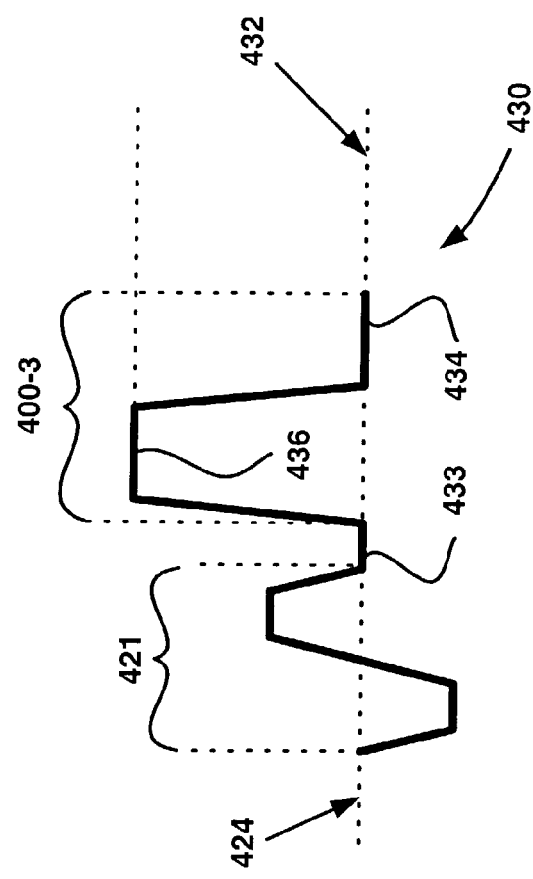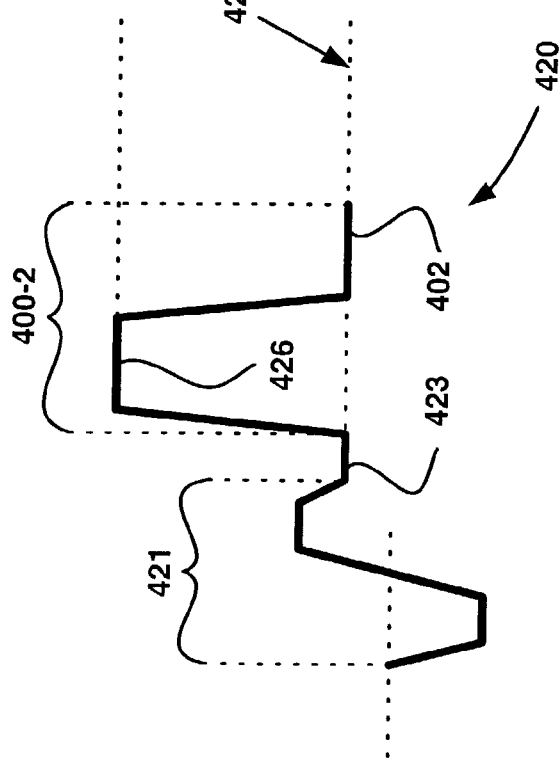

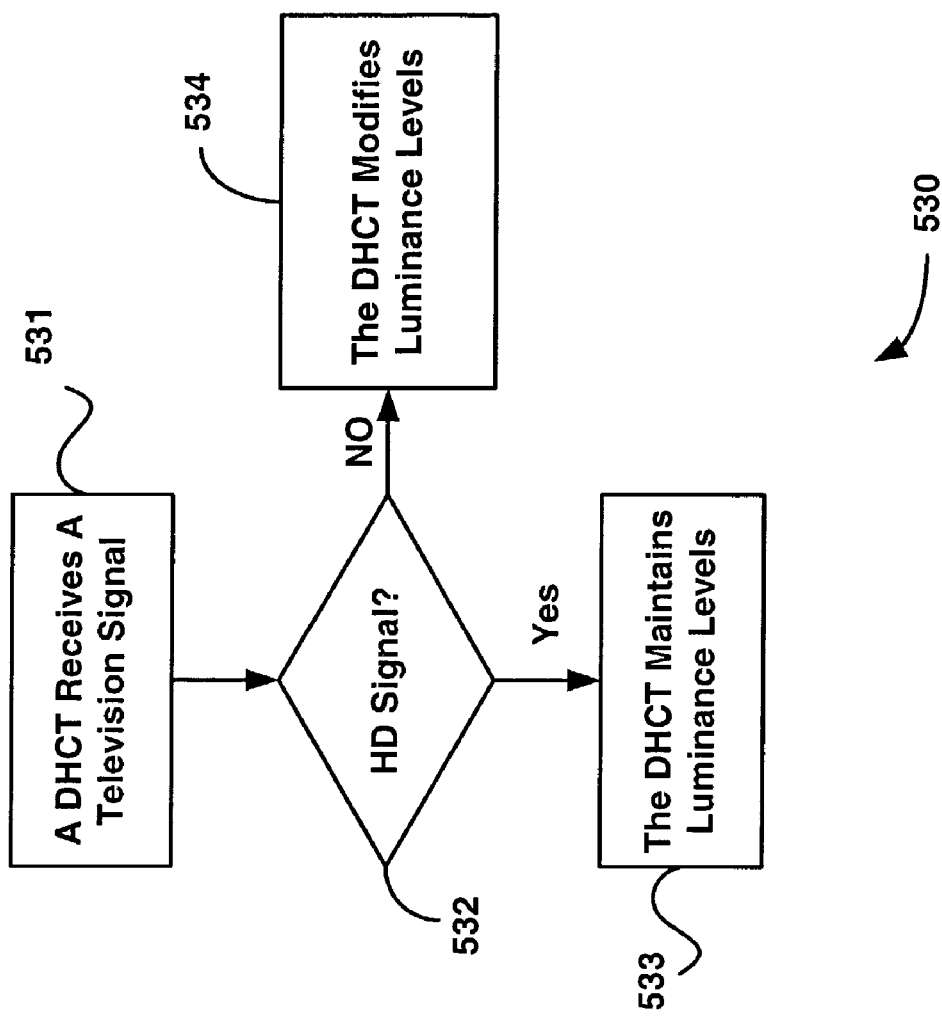

SYSTEMS AND METHODS FOR ADJUSTING
IMAGE CONTRAST

FIELD OF THE INVENTION

This invention relates in general to subscriber television systems and, more particularly, to video processing.

DESCRIPTION OF THE RELATED ART

Cable television systems are now capable of providing many services in addition to analog broadcast video. In implementing enhanced programming, set-top terminals (STTs), also known as set-top boxes, have become important computing devices for accessing various video services. In addition to supporting traditional analog broadcast video functionality, many STTs now also support an increasing number of two-way digital services such as, for example, video-on-demand.

An STT is typically connected to a subscriber television network (e.g., a cable or satellite television network) and includes hardware and software necessary to provide various services and functionality. Preferably, some of the software executed by an STT is downloaded and/or updated via the subscriber television network. Each STT also typically includes a processor, communication components and memory, and is connected to a television or other display device. While many conventional STTs are stand-alone devices that are externally connected to a television, an STT and/or its functionality may be integrated into a television or other device, as will be appreciated by those of ordinary skill in the art.

An STT may receive video presentations that are encoded according to various video format standards such as analog NTSC, digital standard definition, and digital high definition standards, and may then provide the video presentations to a user. The various video format standards specify minimum and maximum analog interface voltage levels corresponding to the black and white level references in the video presentations. One problem with receiving video presentations that are encoded according to various video format standards is that some video presentations may have black and white luminance levels that do not match the black and white reference levels that are used by the display device. As a result, a video image that is encoded in accordance with a first standard (e.g., analog NTSC) and that is displayed in a device that operates in accordance with another standard (e.g., HDTV) can have distorted contrast and brightness levels. For example, some portion of a video image may not be bright enough whereas other portions may not be dark enough. Therefore, there exists a need for systems and methods that address this and/or other problems associated with STTs.

BRIEF DESCRIPTION OF THE DRAWINGS

The invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

FIG. 4A is a schematic diagram depicting a portion of a signal that is received by the HD processor shown in FIG. 3.

FIG. 4B is a schematic diagram depicting a portion of a signal that is output by the output system shown in FIG. 2A.

FIG. 4C is a schematic diagram depicting a portion of a signal that is output by the amplifier circuit shown in FIG. 2B.

FIG. 5C is a flow chart depicting a contrast adjustment method in accordance with another embodiment of the invention.

DETAILED DESCRIPTION OF THE
PREFERRED EMBODIMENTS

In one embodiment of the invention, among others, a method for adjusting image contrast includes determining a format of a television signal and outputting in conjunction with the television signal a reference level. If the television signal has a first format, then the reference level is caused to be substantially equal to a luminance level representing a black color in the first format. However, if the television signal has a second format, then the reference level is caused to be substantially equal to a luminance level representing a black color in the second format.

Figure 1:
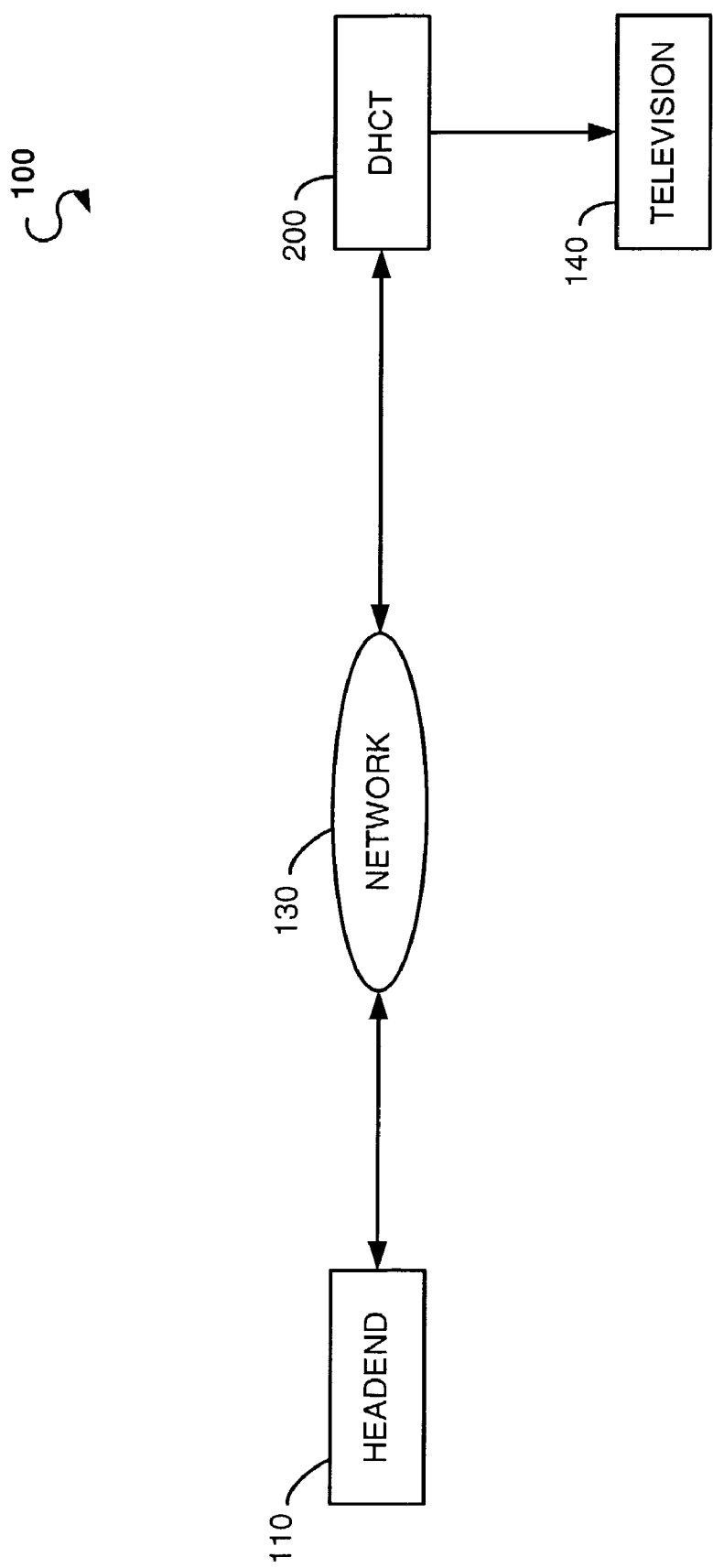
FIG. 1 is a block diagram depicting a non-limiting example of a subscriber television system in accordance with one embodiment of the invention.

In the description that follows, FIG. 1 will provide an example of a system that may be used to implement contrast adjustment, in accordance with one embodiment of the invention. In addition, components that may be used to help implement contrast adjustment are illustrated in FIGS. 2–3. Finally, examples of methods for implementing contrast adjustment are illustrated in the flow charts of FIGS. 4–5. Note, however, that the invention may be embodied in many different forms and should not be construed as limited to the embodiments set forth herein. Furthermore, all examples given herein are intended to be non-limiting, and are provided in order to help clarify the description of the invention.

FIG. 1 is a block diagram depicting a non-limiting example of a subscriber television system 100 in accordance with one embodiment of the invention. In this example, the subscriber television system 100 includes a headend 110 and an STT 200 that are coupled via a network 130. The STT 200 is typically situated at a user's residence or place of business and may be a stand-alone unit or integrated into another device such as, for example, the television 140. The STT 200 receives signals (video, audio and/or other data) including, for example, MPEG-2 streams, among others, from the headend 110 through the network 130 and provides any reverse information to the headend 110 through the network 130. The network 130 may be any suitable means for communicating television services data including, for example, a cable television network or a satellite television network, among others. The headend 110 may include one or more server devices (not shown) for providing video, audio, and textual data to client devices such as the STT 200. The headend 110 and the STT 200 cooperate to provide a user with television functionality including, for example, television programs, an interactive program guide (IPG), and/or video-on-demand (VOD) presentations. The television services are provided via the television 140 which, in one embodiment, is a high definition television (HDTV).

Figure 2A:
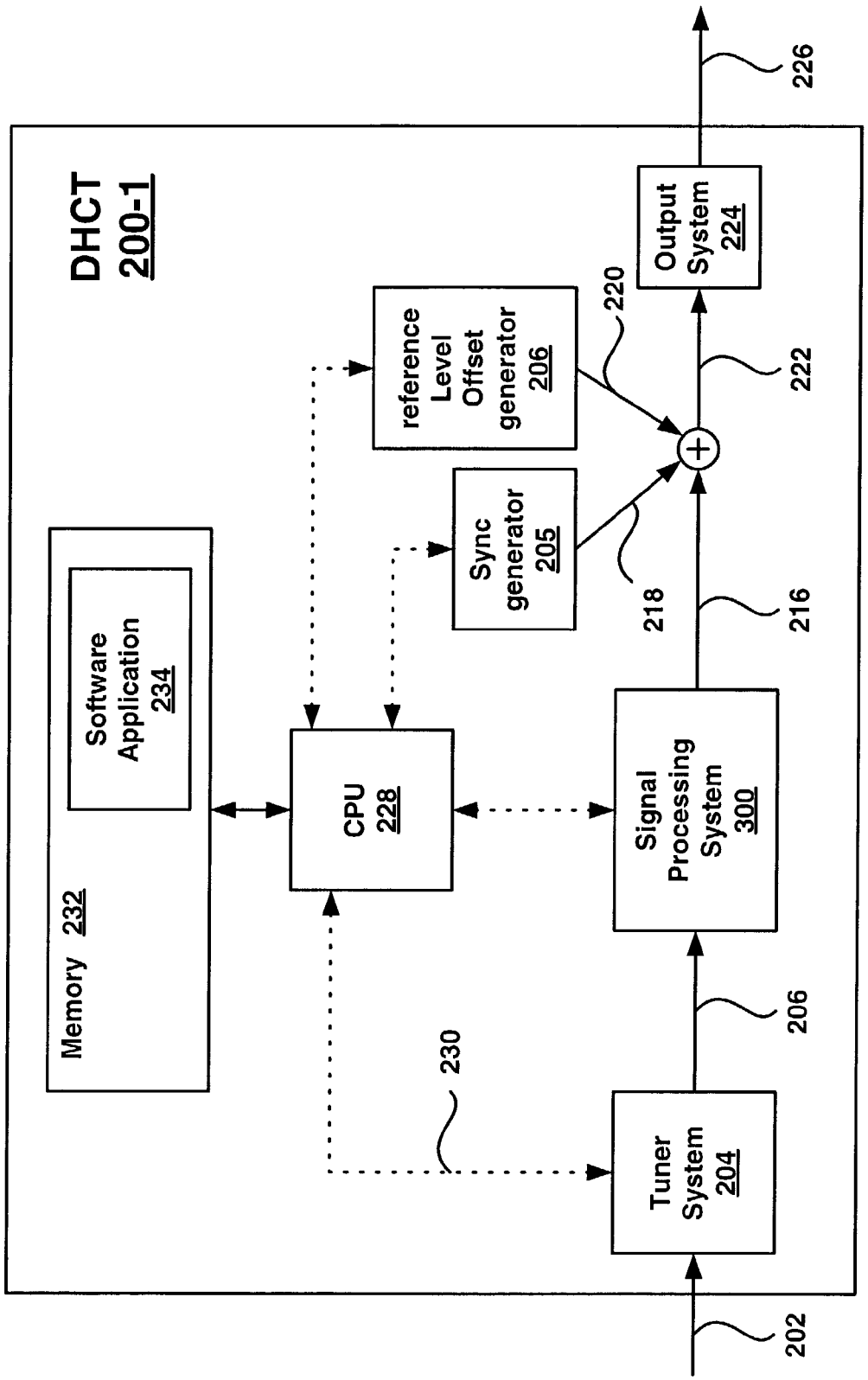
FIG. 2A is a block diagram illustrating selected components of an STT that represents one possible embodiment of the STT shown in FIG. 1.
Figure 3:
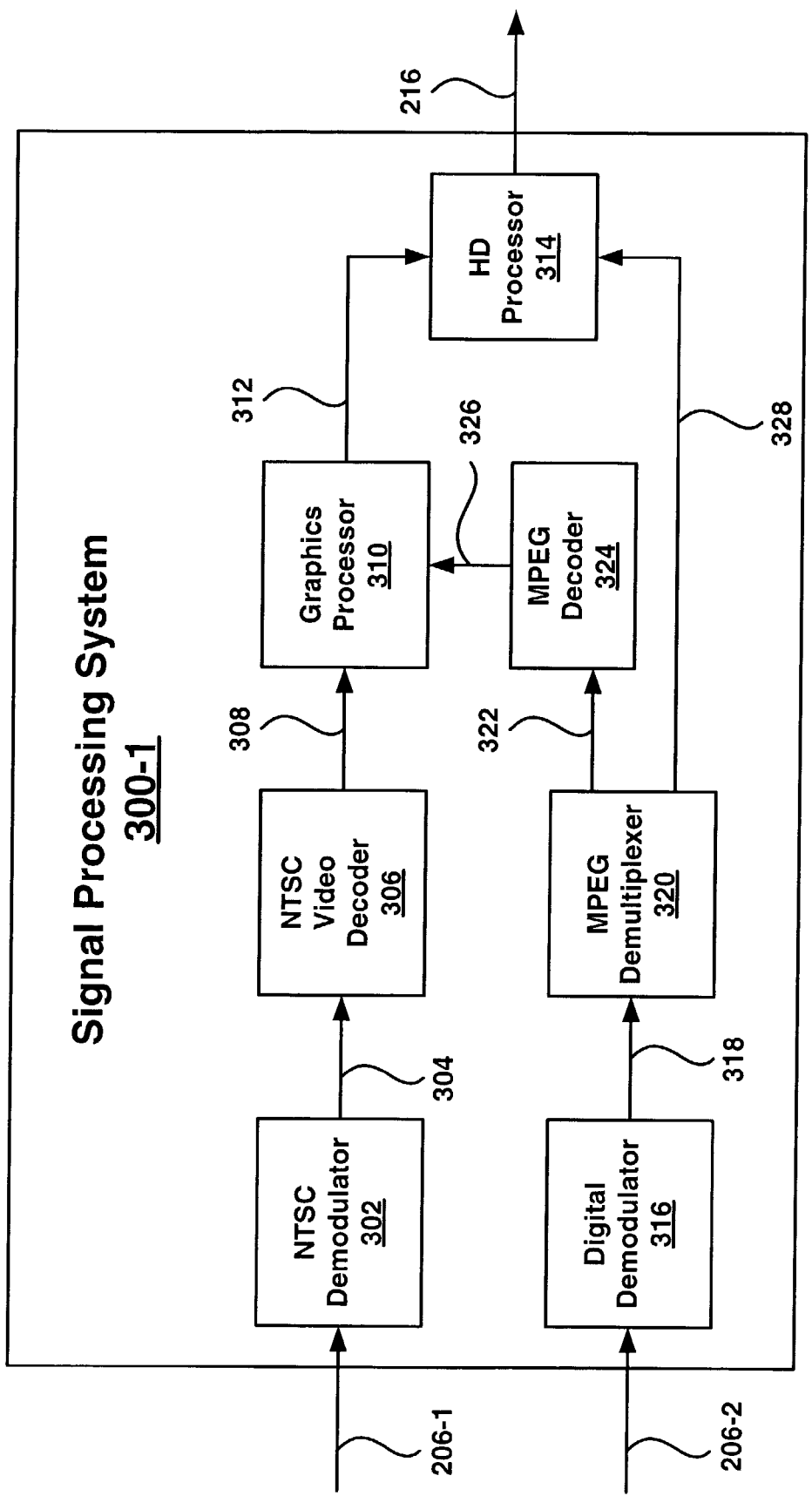
FIG. 3 is a block diagram depicting selected components of a signal processing system that represents one possible embodiment of the signal processing system of the STT shown in FIG. 2A.

FIG. 2A is a block diagram illustrating selected components of an STT 200-1 that represents one possible embodiment of the STT 200 (FIG. 1). The STT 200-1 depicted in FIG. 2A is merely illustrative and should not be construed as implying any limitations upon the scope of the preferred embodiments of the invention. For example, in another embodiment, an STT 200 (FIG. 1) may have fewer, additional, and/or different components than illustrated in FIG. 2A.

The STT 200-1 includes at least one CPU 228 for controlling operations of the STT 200-1, an output system 224 for driving the television 140, and a tuner system 204 for tuning to a particular television channel or frequency and for sending and receiving various types of data to/from the headend 110. The CPU 228 executes instructions contained in software applications (e.g., application 234) stored in memory 232. The output system 224 includes digital-to-analog converters for outputting analog signals that are compatible with the television 140. The tuner system 204 enables the STT 200-1 to tune to downstream media and data transmissions, thereby allowing a user to receive digital and/or analog channels from the subscriber television network 130. The tuner system 204 includes, in one implementation, an out-of-band tuner for bi-directional quadrature phase shift keying (QPSK) data communication and a quadrature amplitude modulation (QAM) tuner (in band) for receiving television channels. The tuner system 204 may also include a plurality of inband tuners for simultaneously receiving a plurality of channels.

The STT 200-1 also includes a signal processing system 300 that is preferably capable of QAM demodulation, forward error correction, demultiplexing MPEG-2 transport streams, and parsing elementary streams. One or more of the components of the signal processing system 300 can be implemented with software, hardware, or preferably with a combination of software and hardware.

The output of the signal processing system 300 is combined with horizontal sync signals 218 and with reference level offset signals 220 and is then provided as input to the output system 224. The horizontal sync signals 218 are generated by a sync generator 205 and the reference level offset signals 220 are generated by the reference level offset signal generator 206. The reference level offset signals 220 are used to modify the contrast of images that are encoded in the output signal 226, as will be explained in more detail below.

Figure 2B:
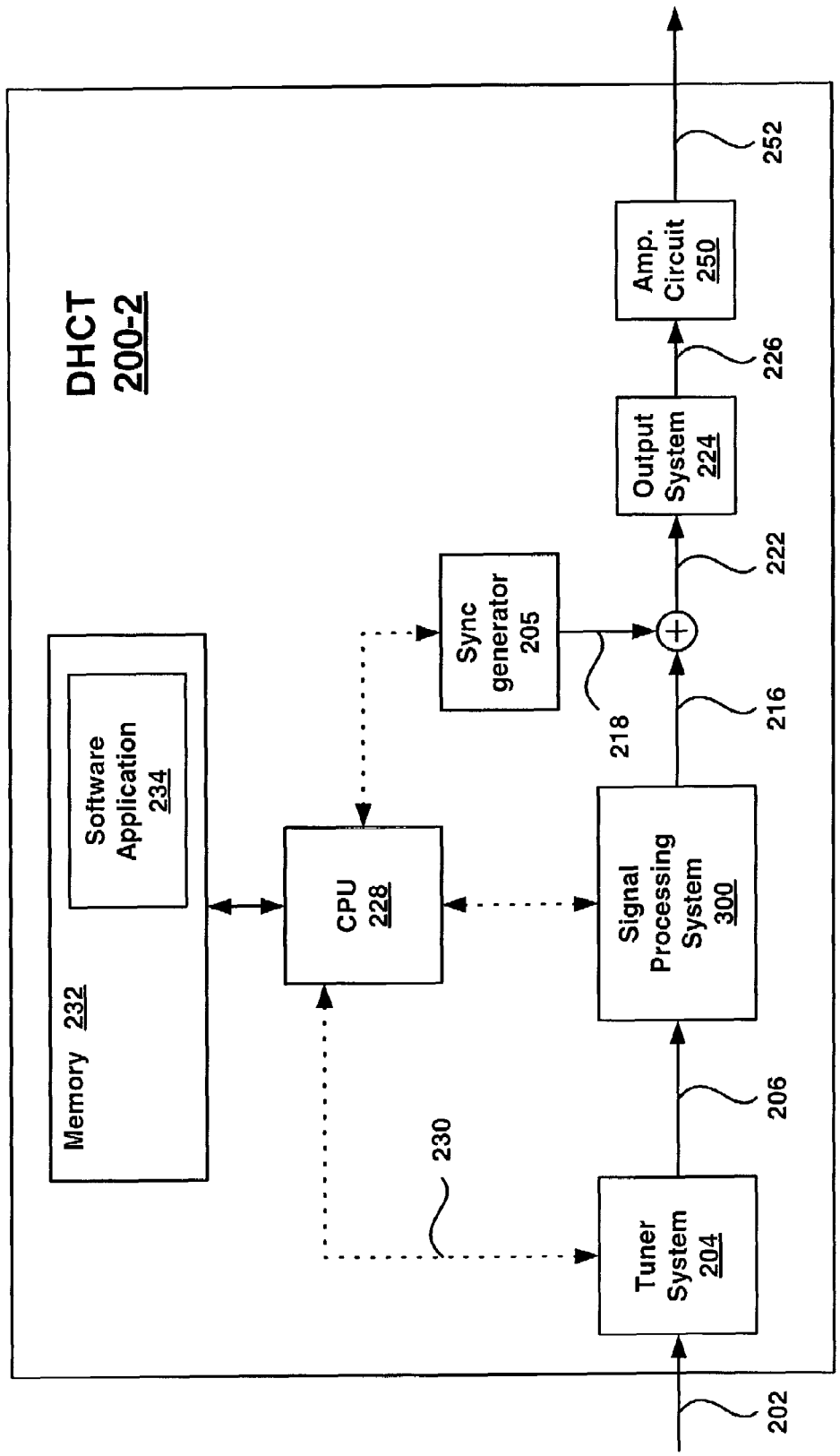
FIG. 2B is a block diagram illustrating selected components of an STT that represents an alternative embodiment to the STT shown in FIG. 2A.

FIG. 2B is a block diagram illustrating selected components of an STT 200-2 that represents an alternative embodiment to the STT 200-1 (FIG. 2A). Note that the STT 200-2 depicted in FIG. 2B is merely illustrative and should not be construed as implying any limitations upon the scope of the preferred embodiments of the invention. As shown in FIG. 2B, the STT 200-2 includes the same components as the STT 200-1 except that the STT 200-2 uses an amplifier circuit 250 instead of a reference level offset generator to modify the contrast of an output signal. The amplifier circuit 250 amplifies the output signal by a predetermined amplification factor and shifts the level of the output signal by a predetermined offset level in order to modify the contrast and brightness of images that are encoded in the output signal 226.

FIG. 3 is a block diagram depicting selected components of a signal processing system 300-1 that represents one possible embodiment of the signal processing system 300 of the STT 200-1 (FIG. 2A). As shown in FIG. 3, the signal processing system 300-1 includes an NTSC demodulator 302 and an NTSC video decoder 306. The NTSC demodulator 302 demodulates analog signals 206-1 and outputs demodulated analog signals 304. The NTSC video decoder 306 decodes the demodulated analog signals 304 into Y, Cb, and Cr components. These components (Y, Cb, and Cr) represent the color space used in the CCIR (Consultative Committee for International Radio communications) 601 specification. The Y component is the luminance component, and the Cr and Cb components are the color difference components.

The signal processing system 300-1 further includes a digital demodulator 316, an MPEG demultiplexer 320 and an MPEG decoder 324. The digital demodulator 316, which in one embodiment is a QAM demodulator, demodulates digital signals 206-2 The MPEG demultiplexer 320 demultiplexes digital signals 318 which are demodulated by the digital demodulator 316. The MPEG decoder 324 decodes signals 322 that have been demultiplexed by the MPEG demultiplexer 320.

The signal processing system 300-1 also includes a graphics processor 310 for adding graphics data to non-HD (non-high definition) television signals 326 and 328. A non-HD television signal may be, for example, among others, a signal that encodes a standard definition image or an NTSC image. The output 312 of the graphics processor 310 is provided to a high definition (HD) processor 314 where it is up-sampled in order to be in an HDTV format. The HD processor 314 also receives HDTV signals 326 from the MPEG demultiplexer 320 and decodes them. The output 216 of the HD processor 314 may then be forwarded to an output system such as for example output system 224 (FIG. 2A). The HD processor 314 may be driven by a software application 234 that is stored in STT memory 232 (FIG. 2A).

FIG. 4A is a schematic diagram depicting a portion 400-1 of a non-HD signal 312 that is received by the HD processor 314 (FIG. 3). The portion 400-1 includes horizontal portions 402 and 403 having luminance levels that would correspond to black and white colors, respectively, in the context of a typical non-HD display system. In one implementation where the non-HD signal is NTSC compliant (i.e., capable of being rendered as an NTSC television image), the luminance level of the horizontal portion 402 is "16" and the luminance level of the horizontal portion 403 is "235" on a luminance scale of 16–235. However, a high definition television (HDTV) typically interprets luminance based on a scale of 0–255. Therefore, the portion 400-1 may be modified as described below in order to better convey the intended luminance values that it contains.

FIG. 4B is a schematic diagram depicting a portion 420 of a non-HD signal 226 that is output by the output system 224 (FIG. 2A). The portion 420 includes a sync 421 (a synchronization signal that is used to help align horizontal lines displayed by a television), a reference portion 423, and a portion 400-2 that represents an amplified version of the portion 400-1 (FIG. 4A). The reference portion 423 may be a blanking level and/or a reference black level. A blanking level is the level of a video signal which separates a range that contains picture information from a range that contains synchronization information. A reference black level is a level that is used to identify the signal level that corresponds to a black color. The portion 400-2 includes horizontal portions 402 and 426. In one implementation, the luminance level of the horizontal portion 402 is 16 and the luminance level of the horizontal portion 426 is 271 on a scale of 16–271. However, the luminance levels 16 and 271 are interpreted by a typical HDTV to be 0 and 255, respectively, because the luminance levels in such a television are measured relative to the reference portion 423.

The level of the reference portion 423 is caused by the reference level offset generator 206 to be at a reference level 428 that is equal to a luminance level of a black color in a typical non-HD system. As a result, the horizontal portion 402 is interpreted to represent black in a high definition display system since it is at the same level as the reference portion 423. Furthermore, the horizontal portion 426 is interpreted to represent white in a high definition display system since it is at a level that is 255 points higher than the reference level. Therefore, it can be seen that a non-HD signal can be displayed at its intended luminance levels by shifting the reference portion 423 to the same level as that which represents a black color in a non-HD display system (e.g., an NTSC television), and by amplifying the signal by a predetermined amount.

FIG. 4C is a schematic diagram depicting a portion 430 of a non-HD signal 252 that is output by the Amplifier circuit 250 (FIG. 2B). The portion 430 includes a sync 421, a reference portion 433, and a portion 400-3 that represents an amplified and offset version of the portion 400-1 (FIG. 4A). The portion 400-3 includes horizontal portions 434 and 436. In one implementation, the luminance level of the horizontal portion 434 is zero and the luminance level of the horizontal portion 436 is 255 on a scale of 0–255.

The luminance level of the horizontal portion 434 is caused by the amplifier circuit 250 (FIG. 2B) to be at the same level as the reference portion 433. As a result, the horizontal portion 434 is interpreted to represent a black color in a high definition display system. Furthermore, the horizontal portion 436 is interpreted to represent a white color in a high definition display system since it is at a level that is 255 points higher than the reference level 432. Therefore, it can be seen that a non-HD signal can be displayed at its intended level of contrast by shifting the signal so that the level of a horizontal portion that is intended to represent a black color is equal to the reference level, and by amplifying the signal by a predetermined amount such that the luminance level of a horizontal portion that is intended to represent a white color is equal to a level that is higher than the reference level by a predetermined amount.

Figure 5B:
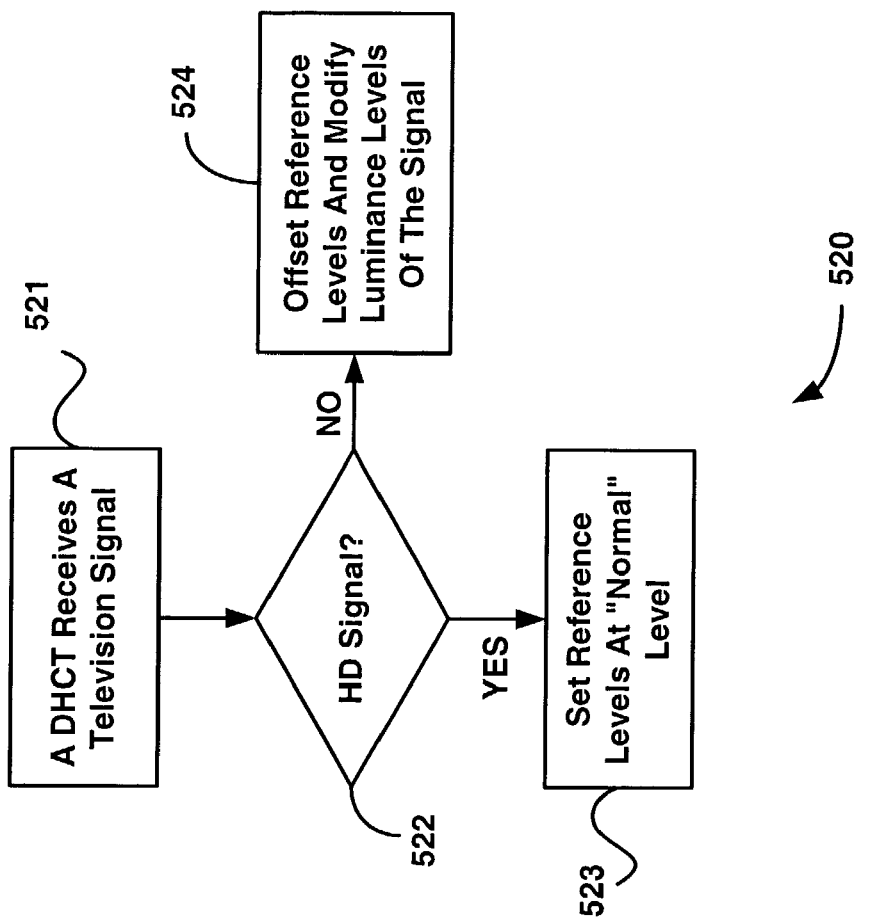
FIG. 5B is a flow chart depicting a contrast adjustment method in accordance with one embodiment of the invention.
Figure 5A:
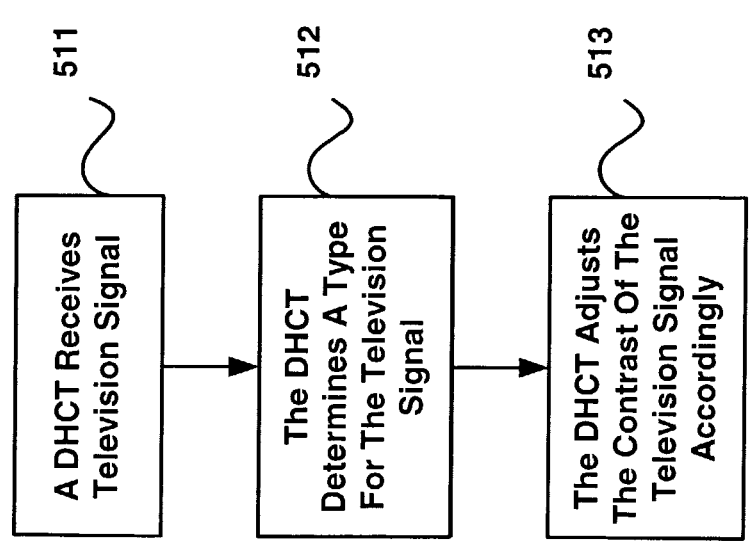
FIG. 5A is a flow chart depicting a contrast adjustment method in accordance with one embodiment of the invention.

FIG. 5A is a flow chart depicting a contrast adjustment method in accordance with one embodiment of the invention. As indicated in block 511, an STT receives a television signal. After receiving the television signal, the STT determines the type of the television signal (e.g., NTSC, standard definition, or high definition) (block 512), and adjusts the contrast of the signal accordingly (block 513). The contrast of the signal may be adjusted by, for example, shifting the reference level and amplifying the signal, or by amplifying and shifting the signal, such that the reference level is aligned with portions of the signal that are intended to represent a black color.

FIG. 5B is a flow chart depicting a contrast adjustment method in accordance with one embodiment of the invention. As indicated in block 521, an STT receives a television signal. After receiving the television signal, the STT determines whether the signal is in a high definition format (block 522). If the signal is in a high definition format, then the reference levels are set and/or maintained (block 523) at a "normal" level, i.e., a level that corresponds to a black color in a high definition display system. If the signal is not in a high definition format, then the reference levels are offset (block 524) so that they are at a level that corresponds to a black color in a non-HD display system. In addition, the luminance levels of the signal are modified such that the difference between a reference level and a signal portion that is intended to correspond to a white color is equal to the difference between signal levels corresponding to black and white, respectively, in a high definition display system. For example, if the received television signal corresponds to an NTSC format, then luminance levels between 16 and 235 are mapped into luminance levels between 16 and 271.

FIG. 5C is a flow chart depicting a contrast adjustment method in accordance with another embodiment of the invention. As indicated in block 531, an STT receives a television signal. After receiving the television signal, the STT determines whether the signal is in a high definition format (block 532). If the signal is in a high definition format, then the signal luminance levels are maintained and, as a result, the contrast of the encoded image is not modified. If the signal is not in a high definition format, then the luminance levels of the signal are modified (block 534) so that the contrast of the displayed image more closely matches the intended contrast. The luminance levels may be modified by shifting the signal such that the level of a horizontal portion that is intended to represent a black color is equal to the level of reference level, and by amplifying the signal by a predetermined amount such that the level of a horizontal portion that is intended to represent a white color is equal to a level that is higher than the reference level by a predetermined amount.

In one embodiment, the blocks shown in FIGS. 5A–5C represent modules, segments, or portions of code which include one or more executable instructions for implementing specific logical functions or steps in a process. One or more of the functions or steps depicted in FIGS. 5A–5C may be executed out of order from that shown or discussed, including substantially concurrently or in reverse order, depending on the functionality involved, as would be understood by those of ordinary skill in the art.

The functionality provided by the methods illustrated in FIGS. 5A–5C, can be embodied in any computer-readable medium for use by or in connection with a computer-related system (e.g., an embedded system such as a modem) or method. In this context of this document, a computer-readable medium is an electronic, magnetic, optical, semiconductor, or other physical device or means that can contain or store a computer program or data for use by or in connection with a computer-related system or method. Furthermore, the functionality provided by the method 200, can be implemented through hardware (e.g., an application specific integrated circuit (ASIC) and supporting circuitry) or through a combination of software and hardware.

It should be emphasized that the above-described embodiments of the present invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and present invention and protected by the following claims. In addition, the scope of the present invention includes embodying the functionality of the preferred embodiments of the present invention in logic embodied in hardware and/or software-configured mediums.

What is claimed is:

1. A method for adjusting image contrast comprising:
receiving a television signal;
determining a format of the television signal;
outputting in conjunction with the television signal a reference level that is substantially equal to a luminance level representing a black color in a first format responsive to the determining that the television signal has the first format; and
outputting in conjunction with the television signal a reference level that is substantially equal to a luminance level representing a black color in a second format responsive to the determining that the television signal has the second format.

2. The method of claim 1, wherein the reference level is a reference black level.

3. The method of claim 1, wherein the reference level is a blanking level.

4. The method of claim 1, wherein the first format is a standard definition format and the second format is a high definition format.

5. The method of claim 1, wherein the first format is an NTSC format and the second format is a high definition format.

6. The method of claim 1, further comprising:
responsive to the determining that the television signal has the first format, amplifying the television signal in order to cause a difference in luminance levels between a luminance level of a signal portion representing a white color and a luminance level of a signal portion representing a black color to be substantially equal to a difference in luminance levels between a black color level and a white color level in the second format.

7. The method of claim 1, wherein the luminance level representing a black color in the first format is 16 on a scale of 16 to 235.

8. The method of claim 1, wherein the level representing a black color in the second format is 0 on a scale of 0 to 255.

9. A system for adjusting image contrast comprising:
a processor; and
memory containing software that is configured to be executed by the processor and that is programmed to cause the processor to:
determine a format for a television signal;
cause a reference level that is substantially equal to a luminance level representing a black color in a first format to be output in conjunction with the television signal responsive to the determining that the television signal has the first format; and
cause a reference level that is substantially equal to a luminance level representing a black color in a second format to be output in conjunction with the television signal responsive to the determining that the television signal has the second format.

10. The system of claim 9, wherein the reference level is a reference black level.

11. The system of claim 9, wherein the reference level is a blanking level.

12. The system of claim 9, wherein the first format is a standard definition format and the second format is a high definition format.

13. The system of claim 9, wherein the first format is an NTSC format and the second format is a high definition format.

14. The system of claim 9, wherein the software is further programmed to cause the processor to:
responsive to the determining that the television signal has the first format, cause the television signal to be modified such that a difference in luminance levels between a signal portion representing a white color and a signal portion representing a black color is substantially equal to a difference in luminance levels between a black color level and a white color level in the second format.

15. The system of claim 9, wherein the level representing a black color in the first format is 16 on a scale of 16 to 235.

16. The system of claim 9, wherein the level representing a black color in the second format is 0 on a scale of 0 to 255.

17. A method for adjusting image contrast comprising:
determining a format of a television signal;
responsive to the determining that the television signal has a first format, adding a voltage offset to the television signal in order to substantially align portions of the television signal representing a black color with a reference level.

18. The method of claim 17, wherein the reference level is a reference black level.

19. The method of claim 17, wherein the reference level is a blanking level.

20. The method of claim 17, wherein the first format is an NTSC format.

21. The method of claim 17, further comprising:
responsive to the determining that the television signal has the first format, amplifying the television signal in order to cause a difference in luminance levels between a signal portion representing a white color and a signal portion representing a black color to be substantially equal to a difference in luminance levels between a black color level and a white color level in a second format.

22. The method of claim 17, wherein the level representing a black color in the first format is 16 on a scale of 16 to 235.

23. A system for adjusting image contrast comprising:
a processor; and
memory containing software that is configured to be executed by the processor and that is programmed to cause the processor to:
determine a format for a television signal; and
responsive to the determining that the television signal has a first format, add a voltage offset to the television signal in order to substantially align portions of the television signal representing a black color with a reference level.

24. The system of claim 23, wherein the reference level is a reference black level.

25. The system of claim 23, wherein the reference level is a blanking level.

26. The system of claim 23, wherein the first format is an NTSC format.

27. The system of claim 23, wherein the software is further programmed to cause the processor to:
responsive to the determining that the television signal has the first format, cause the television signal to be modified such that a difference in luminance levels between a signal portion representing a white color and a signal portion representing a black color is substantially equal to a difference in luminance levels between a black color level and a white color level in a second format.

28. The system of claim 23, wherein the level representing a black color in the first format is 16 on a scale of 16 to 235.

29. A method for adjusting image contrast comprising:
   determining a format of a television signal;
   outputting in conjunction with the television signal a reference level that is substantially equal to a luminance level representing a black color in a first format responsive to the determining that the television signal has the first format;
   outputting in conjunction with the television signal a reference level that is substantially equal to a luminance level representing a black color in a second fonnat responsive to the determining that the television signal has the second format; and
   responsive to the determining that the television signal has the first format, amplifying the television signal in order to cause a difference in luminance levels between a signal portion representing a white color and a signal portion representing a black color to be substantially equal to a difference in luminance levels between a black color level and a white color level in the second format;
   wherein the reference level is a reference black level;
   wherein the first format is an NTSC format and the second format is a high definition format;
   wherein the level representing a black color in the first format is 16 on a scale of 16 to 235; and
   wherein the level representing a black color in the second format is 0 on a scale of 0 to 255.

* * * * *